United States Patent
Freeman

(10) Patent No.: US 6,519,576 B1
(45) Date of Patent: Feb. 11, 2003

(54) METHOD AND SYSTEM FOR PREDICTING TRANSACTION

(75) Inventor: Clive Alan Freeman, Warwick (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/506,163

(22) Filed: Feb. 17, 2000

(30) Foreign Application Priority Data

Sep. 25, 1999 (GB) .............................................. 9922640

(51) Int. Cl.⁷ ...................... G06F 17/30; G06F 15/18; G06F 17/00
(52) U.S. Cl. ............................... 706/21; 706/48; 707/6
(58) Field of Search .......................... 706/48, 21, 10, 706/20, 50; 705/43, 35, 42; 707/6

(56) References Cited

U.S. PATENT DOCUMENTS

| | | | |
|---|---|---|---|
| 5,386,104 A | | 1/1995 | Sime .......................... 235/379 |
| 5,389,773 A | | 2/1995 | Coutts et al. ................. 705/43 |
| 5,546,523 A | * | 8/1996 | Gatto ......................... 345/811 |
| 5,726,688 A | * | 3/1998 | Siefert et al. ............... 345/352 |
| 5,727,129 A | | 3/1998 | Barrett et al. ................. 706/10 |
| 5,748,847 A | * | 5/1998 | Lo .............................. 700/33 |
| 5,864,340 A | | 1/1999 | Bertram et al. ............. 345/780 |
| 5,915,246 A | * | 6/1999 | Patterson et al. ............. 705/43 |
| 5,933,818 A | * | 8/1999 | Kasravi et al. ............... 706/12 |
| 5,963,648 A | * | 10/1999 | Rosen ......................... 380/24 |
| 6,023,685 A | * | 2/2000 | Ramachandran et al. ..... 705/44 |
| 6,026,397 A | * | 2/2000 | Sheppard ...................... 707/2 |
| 6,047,287 A | * | 4/2000 | Caruana ........................ 707/3 |
| 6,049,797 A | * | 4/2000 | Guha et al. ................... 705/27 |
| 6,061,433 A | * | 5/2000 | Polcyn et al. ............ 379/93.12 |
| 6,088,667 A | * | 7/2000 | Murachima ................. 704/219 |
| 6,149,055 A | * | 11/2000 | Gatto .......................... 235/379 |
| 6,192,360 B1 | * | 2/2001 | Dumais et al. ................. 2/101 |
| 6,202,068 B1 | * | 3/2001 | Kraay et al. ................... 707/10 |
| 6,226,408 B1 | * | 5/2001 | Sirosh ........................ 382/156 |
| 6,263,334 B1 | * | 7/2001 | Fayyad et al. ................. 704/9 |
| 6,286,018 B1 | * | 9/2001 | Pitkow et al. .................. 707/3 |
| 6,289,354 B1 | * | 9/2001 | Aggarwal et al. ........ 707/104.1 |
| 6,330,546 B1 | * | 12/2001 | Gopinathan et al. .......... 705/35 |
| 6,349,309 B1 | * | 2/2002 | Aggarwal et al. ............. 705/74 |
| 6,430,539 B1 | * | 6/2002 | Lazarus et al. ............... 705/10 |

FOREIGN PATENT DOCUMENTS

| | | | | |
|---|---|---|---|---|
| JP | | 09062747 | 7/1997 | ........... G06F/19/00 |
| JP | | 410334310 A | * 12/1998 | ............ G07D/9/00 |
| WO | | 9702537 | 1/1997 | ........... G06F/17/60 |

* cited by examiner

*Primary Examiner*—Thomas Black
*Assistant Examiner*—Kelvin Booker
(74) *Attorney, Agent, or Firm*—Gregory M. Doudnikoff

(57) ABSTRACT

The invention provides a system for predicting a transaction a customer may wish to make. In, for example, an Internet banking system, when the customer clicks to bring up an "inter-account transfer" panel, the system may recognise that usually, with a given balance in their savings and cheque accounts, and at this time of the month, at this point in the financial year, the customer will want to transfer a given amount to their cheque account. So, as well as providing a window enabling the customer to manually enter the details for an inter-account transfer, the system also provides a personalised window containing the system's anticipated transaction so that with a single-click the customer can complete the transaction.

12 Claims, 4 Drawing Sheets

METHOD AND SYSTEM FOR PREDICTING TRANSACTION

FIELD OF INVENTION

The present invention provides a method and system for predicting transactions, in particular, to aid in providing personalisation for Internet transactions.

BACKGROUND OF THE INVENTION

It has long been a goal of data mining applications to attempt to predict individual's preferences. Such applications usually operate by gathering user data and perhaps expert information to divide populations into a suitable number of clusters, each cluster being associated with a respective plurality of attribute values, for example, individuals who are married with children, vote democrat, live in suburbia, drink black coffee and earn over $60,000 per annum might form one cluster. When data mining applications are presented with incomplete data for an individual, they find the most suitable cluster for such an individual and use the associated attribute values of the cluster to predict the individuals unknown attributes.

U.S. Pat. No. 5,704,017 discloses a system for collaborative filtering utilizing a belief network. This involves defining a belief network, then cumulatively adding a number of expert supplied and user data to the network, and finally using the network to predict unknown values in the network for a new user. As an example, a belief network with attributes concerning a user's age, sex, income bracket, lifestyle ("sedentary", "active", etc.), coffee preference, and preferred music style can be defined, and user data for these attributes can be added to the network. Then, for a new user, if age, sex, income bracket and lifestyle are supplied the network predicts the user's likely coffee preference and preferred music style. Such a network, however, relies on having access to all (or at least a large portion of) user data before it can make a prediction relating to a single user.

Internet transaction processing systems, for example, Banking sites, which provide access to a range of standard transactions for their customers, including inter-account transfers, bill payment, ordering new cheques, are known. If such transactions were performed in a bank branch environment where the customer is well-known, and has been visiting regularly for a number of years, it is likely that the staff in the branch will get to know the sort of things which the customer wants to do, and will anticipate the customer's requests: for example, the first time the customer visits the branch after payday, they may usually want to take out 250 dollars in cash. So, when the customer approaches the teller, the teller may anticipate this, and have the cash ready at hand. Of course, the customer may not want to perform this transaction, so they can still perform anything else, but they usually do, so this in general will bring a number of advantages: it shortens the transaction time for the customer, increases their loyalty to the bank, and increases the throughput of the bank teller.

It is an object of the present invention to provide the same level of anticipation for transactions performed over the Internet based only on prior customer activity.

DISCLOSURE OF THE INVENTION

Accordingly the present invention provides a personalisation sub-system as claimed in claim 1.

So, for example, when the customer clicks to bring up an "inter-account transfer" panel, the system of the invention may recognise that usually, with a given balance in their savings and cheque accounts, and at this time of the month, at this point in the financial year, the customer will want to transfer 500 dollars to their cheque account. So, as well as providing a window enabling the customer to manually enter the details for an inter-account transfer, the system also provides a personalised window containing the system's anticipated reason for the visit, with a single-click option to complete the current transaction, FIG. 2.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
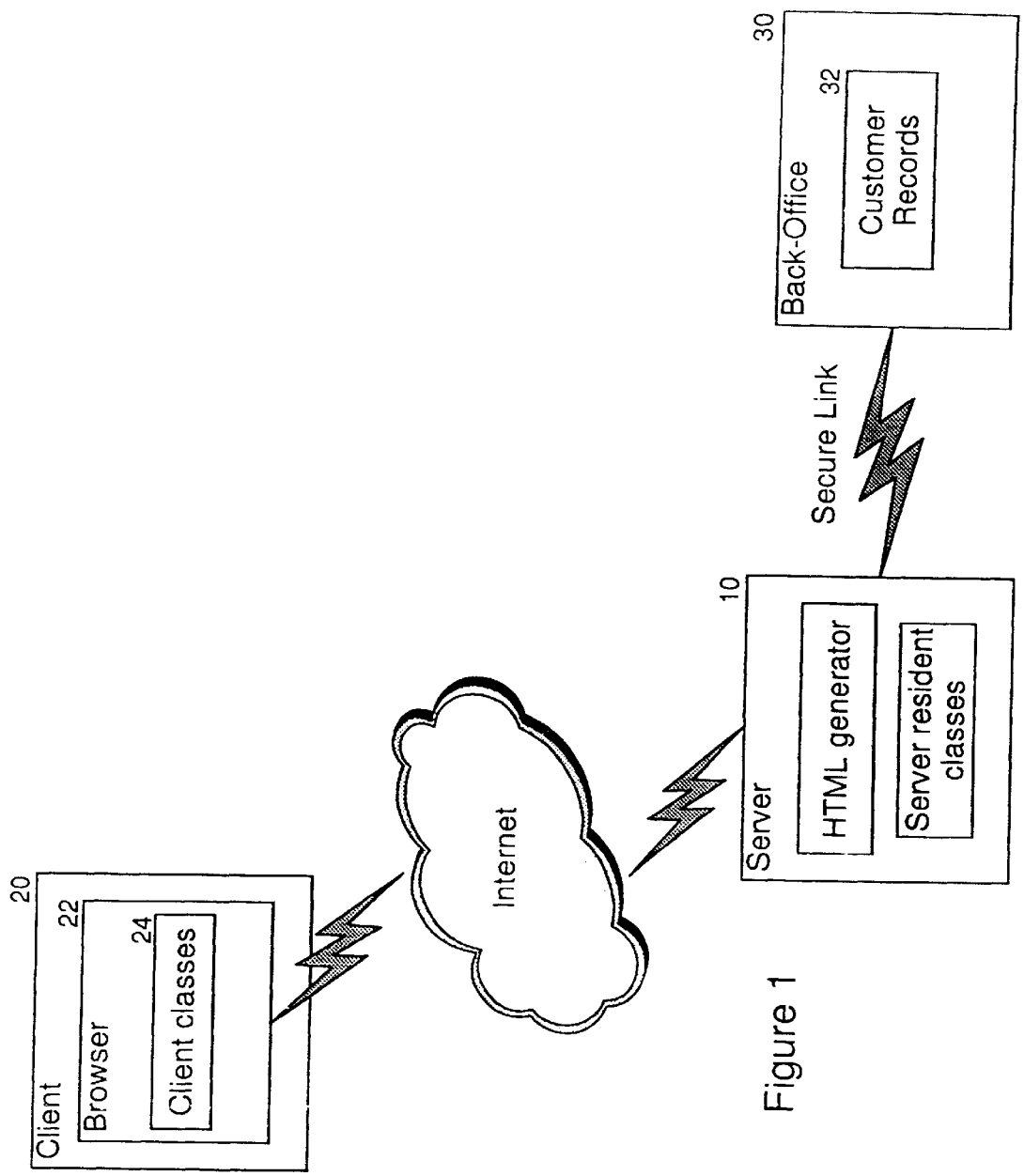
FIG. 1 is a schematic diagram of an Internet banking system including the personalisation sub-system according to the invention.

Referring now to FIG. 1, in an Internet banking system, a customer connects to a bank's web server 10 from a client computing device 20, typically running a web browser 22. In the future, it is envisaged that not alone might customers connect from conventional personal computers, but also from mobile phones or digital televisions or other pervasive computer devices. Nor is it necessary to use a browser, as it is possible for the client to, for example, run a dedicated program.

In any case, the bank's web server typically connects via a secure link to the bank's back-office system 30 where customer records 32 are stored. In response to customer interaction with pages displayed on their browser, the bank's web server delivers further HTML pages. These pages range from the bank's home and login pages, the same for every customer, to customer specific pages displaying the customer's account details retrieved from the secure back-office system and pages enabling the customer to execute transactions. The actual delivery of these customer specific pages may be accomplished by any number of standard mechanisms for producing dynamic content on HTML pages, such as a CGI gateway programs, Java Server Pages (JSPs) or Active Server Pages (ASPs), the description of which is not thought necessary for the purposes of describing the operation of the present invention.

It should be seen that processing of the customer's interaction with the bank site takes place on both the bank's server and the client computing device. Typically, client side processing involves the instantiation of pre-loaded classes 24 resident on the client device. Using client side processing has the advantage of reducing server processing load and speeding up application response time.

In a preferred embodiment, the banking system comprises a personalisation sub-system for addressing the problem of discovering what is the "most likely reason" for a customer to want to perform a transaction. As will be described, the sub-system operates only on the customer's historical data to make a prediction of the attributes of the record for the transaction to be performed—the target record. As the customer's data can be made available on the client device, the personalisation sub-system can therefore comprise classes resident on the client device with all the attendant speed benefits this brings. This contrasts with prior art data mining systems which typically define clusters from information from large customer populations before making a prediction in relation to a single customer.

It will be seen, however that, for implementations dozens of records are retrieved, the overhead of records over the Internet to the client for it to process may swamp any benefits of the client itself being faster at processing (having more spare MIPS). In such cases, the Java application could be reside on the server side, behind JSPs or ASPs, and generate HTML as its result, to be sent to the client.

Figure 2:
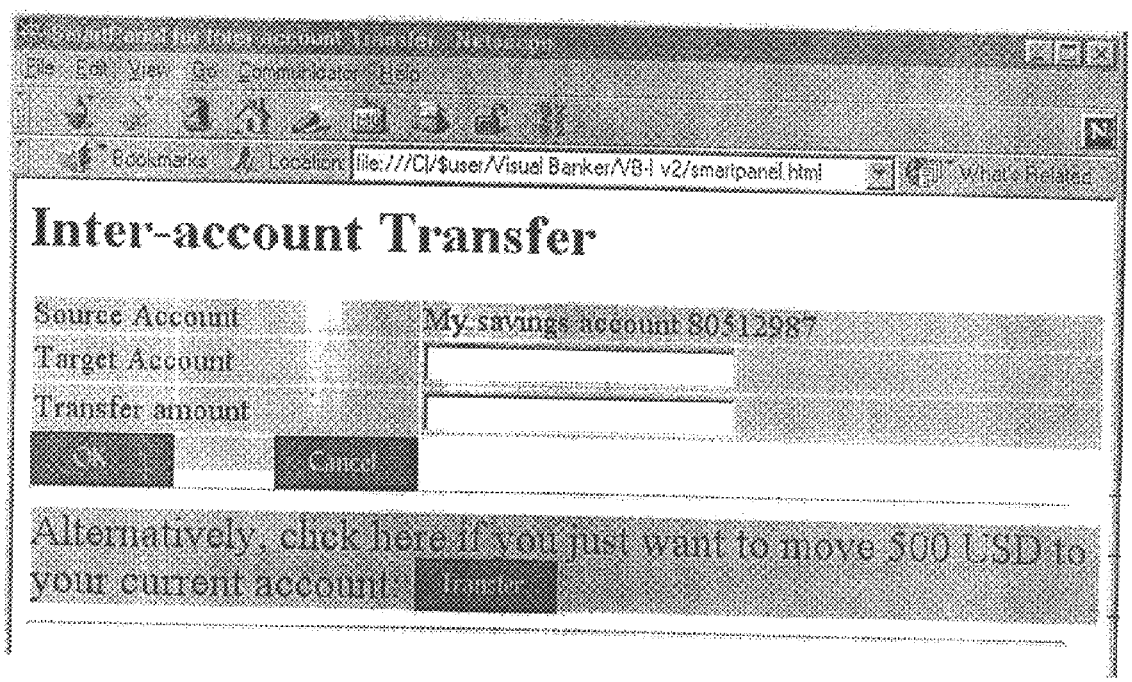
FIG. 2 shows a page for a predicted transaction generated according to the invention.
Figure 3:
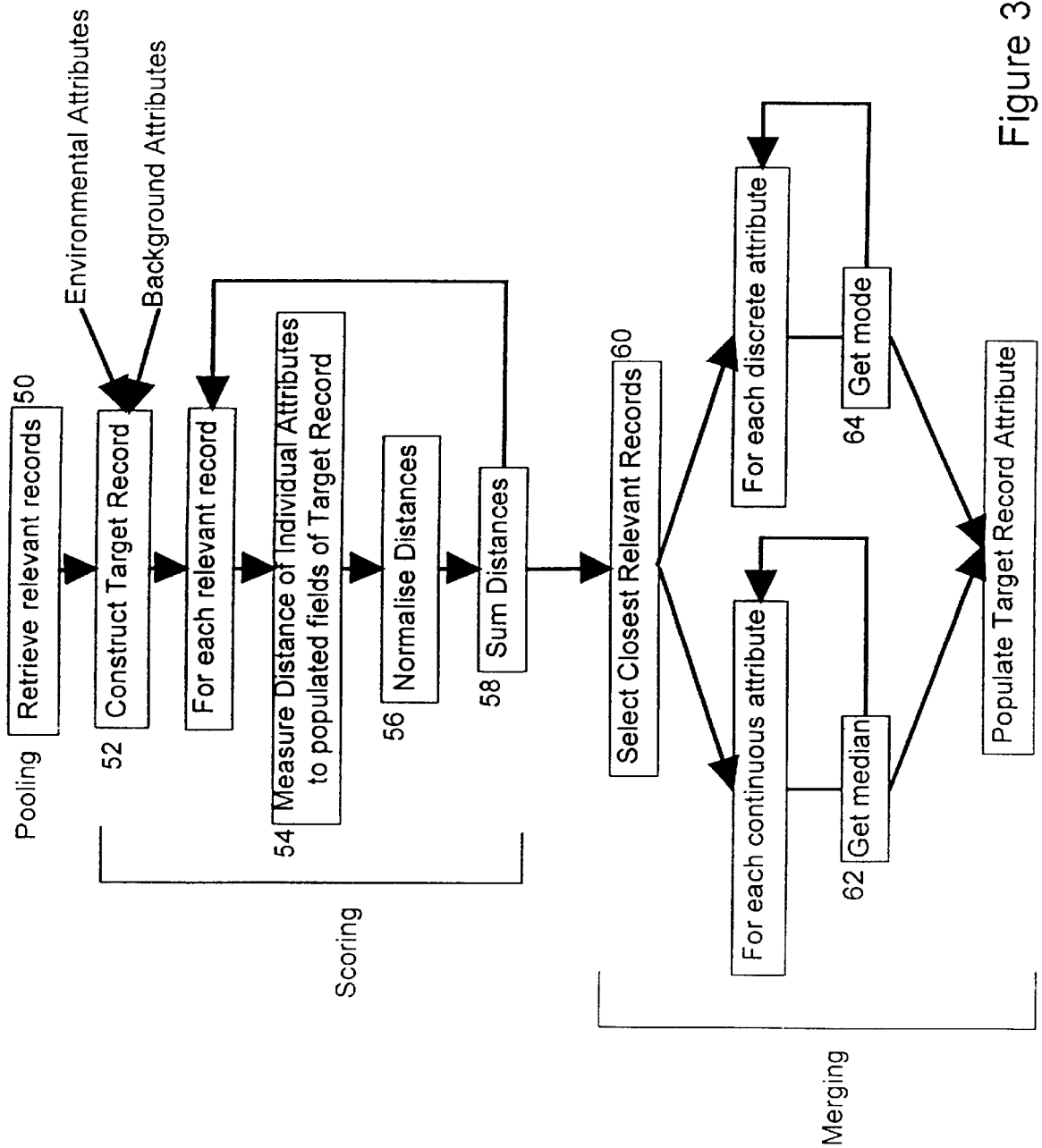
FIG. 3 is a flow diagram illustrating the operation of a first embodiment of the invention.

In any case, the personalisation sub-system responds to a user moving to perform the current transaction to execute three stages which will be described with reference to FIG. 3:

Pooling: All relevant customer historical data records are retrieved, and made available in a "pool", step 50. For example, if the customer chooses to make a payment to a credit card account, then previous credit card payments are retrieved; if a customer chooses to pay a bill, then previous bill payments are retrieved. Each record matches a standard template with fixed attributes and attribute types. In the transaction of FIG. 2, which shows an inter-account transfer, the template has the following attributes:

sourceAccount targetAccount transferAmount sourceAccountBalanceBeforeTransfer targetAccountBalanceBeforeTransfer dayOfTheWeekofTransfer (range 0–6)

dayOfTheMonthOfTransfer (range 1–31)

monthOfTransfer (range 1–12)

In this case, two attributes are unknown: targetAccount and transferAmount, as the system attempts to predict both the account the customer may wish to transfer money into and the amount to be transferred.

Scoring: The objective of the scoring step is to find similar records from the pool to the current transaction.

To do this, a target record is now constructed, step 52, with some attributes populated with known details for the current transaction. In the example above, the target record has the sourceAccount, sourceAccountBalanceBeforeTransfer, and the date attributes filled in. The date related attributes, whether generated automatically, assuming the customer wishes the transaction to execute immediately, or manually when they are entered directly by the customer, can be thought of as environmental attributes. Other attributes such as account balances can be thought of as background attributes.

After this step, the "pool" contains a number (potentially, dozens or even hundreds) of records matching this template, preferably with all possible attributes populated in each record (for some templates, it may not be possible to complete all attributes for each record).

The scoring step generally comprises going through each record in the pool, and scoring it for its similarity to the target record. The notion of "similarity" is defined by how close a record is, in a multi-dimensional space, to the target record.

To define how close a record is to the target record, each attribute which has a value in the target record and the corresponding value in the historical record under inspection are examined, step 54. A measure of "distance" is applied to these two records: for example, for the dayOfTheWeekOfTransfer attribute, the distance could be the difference, modulo 7, between the two values: so the distance between 3 and 5 is 2, and the distance between 6 and 0 is 1.

Quantitative values from individual attributes are translated into qualitative values to allow a distance calculation from more than one attribute. This is done by normalising the distances, step 56, so that a distance of 100 (between two sourceAccountBalanceBeforeTransfer amounts of 5000 and 5100, perhaps) does not totally dominate a distance of 1 in the dayOfTheweekOfTransfer. The scaling used to perform this normalisation depends on the normal range of values in each attribute, and is preferably to predefined by a human business analyst.

Once normalised distances are available for each attribute, they are composed to provide an overall score of "similarity", step 58. In the preferred embodiment, this composition uses Euclidian notion of distance, that is the square root of the sum of the squares of each historical record's attribute's distance from its corresponding target record's attribute.

Merging: In the first embodiment, all but the nearest records are now excluded from consideration, step 60: the cutoff value which defines "nearest" is again initially set by human business analysts, but can be automatically fine-tuned by the system as it discovers that people do, or do not, tend to take the personalised transaction recommendation provided by the system.

In practice, some optimisation is possible so that every record does not need to be examined, but that some records can be discarded early as they will be known to be "too far away" from the target record. Such optimisation does not affect the principle of this invention.

Having obtained a subset of the overall record set, comprising those records which are "similar" to the target record, the final step merges these records, to produce a most-likely completed version of the target record, with missing attributes filled in. It is this completed target record which is then used to fill the "personalised transaction" field of FIG. 2.

Merging comprises filling in the blank values of interest in the target record. So, for each blank value of interest (and not all may be of interest—in the example of FIG. 2, only the targetAccount and transferAmount attributes are of interest), a "most likely" value is found.

For most attribute types, experiments have shown that the median (for continuous values) or mode (for discrete values) of the corresponding attributes from the set of nearest historical records are most appropriate. That is, the missing attribute value is taken to be the median or modal value from the subset of records defined as "similar" to the target record, steps 62 & 64.

The resulting completed target record is then used to produce the HTML text in the window accompanying the target transaction, FIG. 2.

It will be seen, however, that in certain cases a prediction for the current transaction is only useful if is exactly what is required. Take for example, a customer who always pays their entire credit card bill. If previous bills have amounted to US$300, US$500 and US$700 and the current bill is $550, then a predicted transfer amount of US$500 is of no use to the customer.

In a second embodiment of the invention, a derived attribute, comprising a "ratio" of two other attributes is chosen by a domain expert as an attribute which is potentially useful in prediction. In the example of a credit card payment, such a useful ratio might be the ratio of the credit card bill to the previous amount paid. This attribute is calculated for the historical records and used in the prediction of other attributes in the target record.

A weighting is associated with each attribute and the sub-system performs an automatic adjustment of weightings to select the appropriate target attribute on which to base a prediction, based on only the historical data for this customer.

The weighting of the target attributes is used to determine which target attribute is used for prediction whether it is an absolute value type attribute, or a derived value attribute such as a ratio.

Note that the utility of the ratio attribute, as determined by the weighting given to it, will be particular for this customer: although an initial weighting may be given to the ratio by a domain expert, the actual weighting used will, over time, be largely determined by a customer's behaviour.

Figure 4:
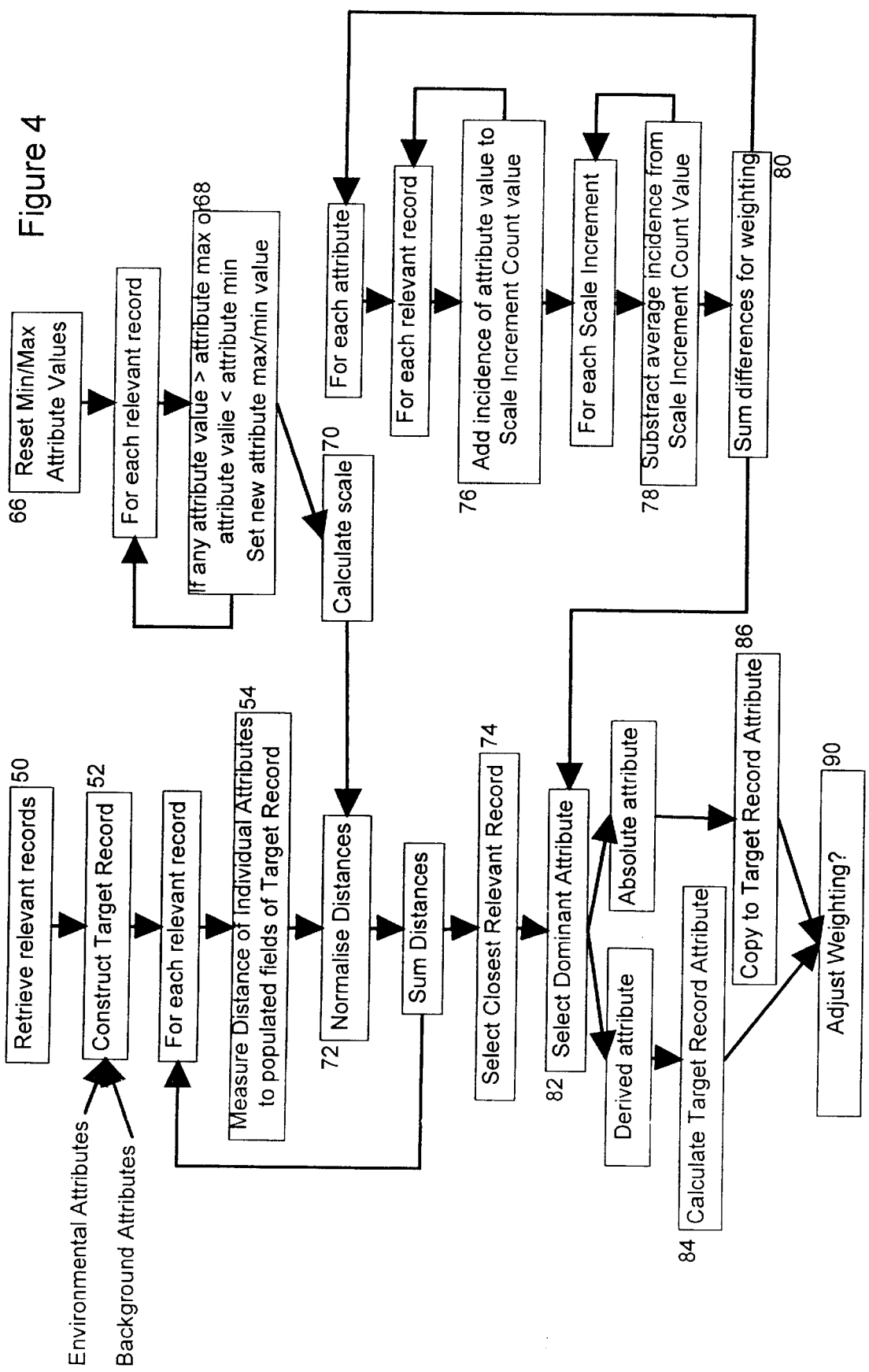
FIG. 4 is a flow diagram illustrating the operation of a second embodiment of the invention.

The operation of the second embodiment will now be described in more detail with reference to FIG. 4. The example used is that of credit card payments, where the sub-system is trying to anticipate the credit card repayment amount which a customer will make, so the system can pre-fill the repayment amount for the customer.

The bank has historical data for each customer relating to earlier credit card payments. For each payment, the bank knows the month (1–12), the cheque account balance, the credit card balance at date of repayment, and the amount of payment made by the customer.

Based on the domain expert's understanding of credit card repayments, the expert adds a fifth attribute which may be useful in determining likely repayment: the ratio of the credit card payment to the credit card balance. The minimum payment required by the bank on an outstanding balance is 10% of the balance, a ratio of 0.1; the likely maximum ratio for a customer is 1.0 (ignoring over-payment of a balance). The domain expert also decides to give both target attributes (absolute amount and ratio) an equal initial weighting.

The following data represents the credit-card payments of a customer over a year (these are in fact rounded amounts taken from a live account).

| Month | Cheque account balance: Chqbal | Credit card balance: CCbal | Payment (CCpay) | Ratio CCpay/CCbal |
|---|---|---|---|---|
| 1 | $50 | $350 | $35 | 0.1 |
| 2 | $450 | $440 | $440 | 1.0 |
| 3 | $650 | $120 | $120 | 1.0 |
| 4 | $710 | $210 | $210 | 1.0 |
| 5 | $760 | $180 | $180 | 1.0 |
| 6 | $550 | $230 | $230 | 1.0 |
| 7 | $50 | $290 | $29 | 0.1 |
| 8 | $610 | $380 | $380 | 1.0 |
| 9 | $680 | $160 | $160 | 1.0 |
| 10 | $710 | $130 | $130 | 1.0 |
| 11 | $770 | $190 | $190 | 1.0 |
| 12 | $610 | $320 | $32 | 0.1 |

By observation, it can be seen that this customer pays off all their credit card balance most months, only paying the minimum when it's around the turn of the year (Christmas), or when they haven't got much money in their account (during the customer's summer vacation, in this case). It will be seen that to "hard-wire" such information into the sub-system could prove extremely complex, whereas the method according to the invention, while operating in a generic manner, provides surprisingly useful predictions.

The method presented below is in a non-optimal form for explanatory purposes, although it should be seen that run-time optimisation can be used in practice to prevent re-scanning of the data, but this does not alter the net effect of the invention.

1. Minimum and maximum values for each attribute of the current transactions (in this case, month, Chqbal, Ccbal, CCpay, CCpay/CCbal) are set to null, step 66.
2. Each historical data record is presented to the sub-system. For each record:
   If an attribute in the record is a new minimum or maximum value for that element, the current minimum or maximum is updated, step 68.
3. Once every historical data record has been presented, normalisation scales are derived for each attribute, step 70, to normalise the values of each attribute onto a scale:

scale increment=(maximum value−minimum value) number of scale increments

So in the case of the credit card payments above, the scale is divided into 10 slots between $29 and $440. A payment of $45 is given an index of 0, whereas a payment of £250 is given an index of 5.

4. When a partially filled target record is presented, the Euclidian distance from each of the historical data records, adjusted by the attribute scale, is determined:

$$\text{EuclidianDistance} = \sqrt{\Sigma(\text{NormalisedAttributeDistance}^2)}$$

For most attributes, the attribute distance is simply one value minus the other value and the normalised attribute distance is this value divided by the scale increment and rounded.

For circular attributes such as the month of the year, time of day, etc., the normalised attribute distance is the nearest distance modulo an appropriate number: so months 3 and 12 are distance 3 apart, not 9 apart (March is three months from December).

In any case, normalisation comprises adjusting the attribute difference by the scale increment for that attribute, step 72.

5. The selected historical data record with which to make the prediction is the one with the shortest calculated distance from the target record, step 74. The attribute from the selected historical record which is to be used to make the prediction (in this case, CCpay or the ratio of CCpay/CCbal) is then determined.
6. For the target record attributes, a count is made to determine which, for this customer, is the more interesting attribute. One fast way to do this for small data sets is to sum the absolute deviations from the average count (1.2, in this case, for 12 values from the previous transactions across 10 scale increments), steps 76 to 80. For the sample data, we have:

| Normalised CC pay range | Count | Absolute (Count-1.2) | Normalised ratio range | Count | Abs (Count-1.2) |
|---|---|---|---|---|---|
| 29–69 | 3 | 1.8 | 0.1–0.18 | 3 | 1.8 |
| 70–110 | 0 | 1.2 | 0.19–0.27 | 0 | 1.2 |
| 111–151 | 2 | 0.8 | 0.28–0.36 | 0 | 1.2 |
| 152–192 | 3 | 1.8 | 0.37–0.45 | 0 | 1.2 |
| 193–233 | 2 | 0.8 | 0.46–0.54 | 0 | 1.2 |

-continued

| Normalised CC pay range | Count | Absolute (Count-1.2) | Normalised ratio range | Count | Abs (Count-1.2) |
|---|---|---|---|---|---|
| 234–274 | 0 | 1.2 | 0.55–0.63 | 0 | 1.2 |
| 275–315 | 0 | 1.2 | 0.64–0.72 | 0 | 1.2 |
| 316–356 | 0 | 1.2 | 0.73–0.81 | 0 | 1.2 |
| 357–397 | 1 | 0.2 | 0.82–0.9 | 0 | 1.2 |
| 398–440 | 1 | 0.2 | 0.91–1.0 | 9 | 7.8 |

So the total weighting for CCPay was 10.6 whereas the weighting for the ratio attribute was 21.6. As such the ratio attribute, as expected, is considered to be the most useful, in this customer's case, for making a prediction.

It should be noted that more accurate weightings, based on the kurtosis of the distribution, or the standard deviation of the slot counts could be used although it has been found that this does improve performance much for this type of data. The weighting employed above, however, has the benefit of simplicity and speed. More complex weightings may be more beneficial for other domains.

It should also be noted that for attributes with a discrete value range, more or less than ten slots may be appropriate: for days of the week, seven slots should be used; for months of the year; twelve slots should be used; or for a yes/no value, two slots should be used.

7. The dominant target attribute is selected, step 82, and used for prediction: in this example, the target attribute selected is the ratio attribute. The sub-system then populates as many possible attributes as possible in the target record from this dominant attribute, in this case, calculating the amount of the payment, step 84. Step 82 is repeated, if necessary, and the next most dominant attribute which has not been populated in the target record is chosen, and either further attributes are calculated from this attribute, if it is a ratio, or if it is an absolute value, then its value is simply copied into the corresponding attribute of the target record, steps 84 and 86. This process continues until the target record has been fully populated.

Based on the sample data above, some sample predictions are:

| Sample | Mth | Cheque account balance: Chqbal | Credit card balance: CCbal | Nearest record | Ratio CCpay/CCbal |
|---|---|---|---|---|---|
| #1 | 1 | $250 | $380 | 1 | 0.1 |
| #2 | 1 | $450 | $380 | 2 | 1 |

So, it can be seen that if the customer has a high cheque account balance, the prediction is that they will pay off the whole credit card balance, even though this is January, and last January they didn't pay off the whole balance. If the customer has a low balance, the prediction is that they will pay of partial balance. It should be seen that it is because the customer normally pays the full amount that means that the ratio is chosen as the dominant attribute, and so, where the closest historical record is one where the ratio is 0.1, the system will predict that a partial payment is required, rather than a full payment as would normally be the case.

8. If a prediction is accepted by the customer, any initial weighting assigned by the domain expert to select the target record attribute is adjusted by the determined weights, step 90. So in the example above, using a simple adjustment, initial weightings of, say, 5 would be adjusted to 15.6 and 26.6 respectively. This helps to re-enforce the ability of the sub-system to predict well.

In a second example of the operation of the second embodiment, the customer chooses to pay an electricity bill, and so the target attribute the sub-system attempts to predict is the amount to be paid, without knowing the amount of the bill. Again only the amount needs to be predicted, although it will be seen that if both the nature of the bill and the amount needed to be predicted, this would also be possible.

| Month | Cheque account balance | Electricity bill payment |
|---|---|---|
| 2 | 450 | 135 |
| 5 | 760 | 100 |
| 8 | 610 | 65 |
| 11 | 770 | 75 |

In this example, the domain expert selects no ratio. Instead, the system tends to recommend the same payment as was made at this time last year. Using the system, next year, in month 2, with a cheque account balance of $760, the algorithm will predict a bill payment of $135, which is a reasonable guess from a domain expert's viewpoint.

It will be seen that while the examples described above relate to Internet Banking transactions, the invention has wider applicability for other, similar, transaction types where the attributes of a partially filled record are to be predicted from a set of historical records.

What is claimed is:

1. A personalisation sub-system for an Internet transaction processing system comprising a web server responsive to requests from a web client computing device to execute a transaction, said sub-system comprising:

means, responsive to said client request, for obtaining historical records corresponding to previous client transactions;

means for partially populating a target record from data available to said sub-system, said target record comprising a plurality of attributes;

means for measuring a similarity of each of said historical records to said partially populated target record, wherein said means for measuring comprises means for calculating a normalised Euclidian distance between each of said historical records and said partially populated target record:

means for selecting at least one similar historical record;

means for populating remaining target record attributes from at least one corresponding attribute of the at least one similar historical record; and means for providing said populated target record to said system as a prediction of said transaction to be executed.

2. A personalisation sub-system as claimed in claim 1 wherein said sub-system is adapted to reside on said client computing device.

3. A personalisation sub-system as claimed in claim 1 wherein said selecting means is adapted to select a pre-determined number of similar historical records; and said populating means is adapted to populate said remaining target record attributes as a function of said pre-determined number of similar historical records' corresponding attributes.

4. A personalisation sub-system as claimed in claim 3 wherein said function is a median of said pre-determined number of similar historical records' continuous attributes or a mode of said pre-determined number of similar historical records' discrete attributes.

5. A personalisation sub-system as claimed in claim 1 comprising:
- means for calculating a weighting for each remaining target record attribute, said weighting being indicative of a remaining target record attribute's dominance; and wherein said selecting means is adapted to select a most similar historical record; and said populating means is adapted to populate said remaining target record attributes in order of said remaining target record attributes' dominance.

6. A personalisation sub-system as claimed in claim 5 wherein said target record attributes comprise a combination of absolute value attributes and attributes whose value is derived from other attributes, and said populating means is responsive to a derived value attribute being the most dominant remaining attribute to populate said target record's corresponding derived value attribute and any remaining target record attributes that can be calculated from said derived value attribute.

7. A personalisation sub-system as claimed in claim 1 comprising:
- means, responsive to said client accepting said prediction, for increasing the weighting of the most dominant remaining target record attribute.

8. A personalisation sub-system as claimed in claim 1 wherein said transaction processing system is an Internet Bank System.

9. A personalisation sub-system as claimed in claim 8 wherein said available data comprises any combination of a current time, a current date or one or more current account balances.

10. A personalisation sub-system as claimed in claim 1 wherein said measuring means comprises means for calculating a normalised Euclidian distance between each of said historical records and said partially populated target record.

11. A method, operable in an Internet transaction processing system comprising a web server responsive to requests from a web client computing device to execute a transaction, of personalising said system, comprising the steps of:
- responsive to a client request from a web client computing device, obtaining historical records corresponding to previous client transactions;
- partially populating a target record from data available to said system, said target record comprising a plurality of attributes;
- measuring a similarity of each of said historical records to said partially populated target record, wherein said measuring step comprises calculating a normalised Euclidian distance between each of said historical records and said partially populated target record;
- selecting at least one similar historical record;
- populating remaining target record attributes from at least one corresponding attribute of the at least one similar historical record; and
- providing said populated target record to said system as a prediction of said transaction to be executed.

12. Computer readable code stored on a computer readable storage medium for an Internet transaction processing system comprising a web server responsive to requests from a web client computing device to execute a transaction, said computer readable code comprising:
- first subprocesses, responsive to said client request, for obtaining historical records corresponding to previous client transactions;
- second subprocesses for partially populating a target record from data available to said sub-system, said target record comprising a plurality of attributes;
- third subprocesses for measuring a similarity of each of said historical records to said partially populated target record, said third subprocesses calculating a normalised Euclidian distance between each of said historical records and said partially populated target record to identify highly similar historical records from said historical records;
- fourth subprocesses for selecting at least one of said highly similar historical records;
- fifth subprocesses for populating remaining target record attributes from at least one corresponding attribute of the selected highly similar historical records; and
- sixth subprocesses for providing said populated target record to a personalisation sub-system as a prediction of said transaction to be executed.

* * * * *